United States Patent
Kawasaki et al.

(10) Patent No.: US 11,061,641 B2
(45) Date of Patent: Jul. 13, 2021

(54) SCREEN SHARING SYSTEM, AND INFORMATION PROCESSING APPARATUS

(71) Applicants: Yuichi Kawasaki, Kanagawa (JP); Shigeru Nakamura, Kanagawa (JP); Masashi Ogasawara, Kanagawa (JP); Atsushi Miyamoto, Kanagawa (JP); Hiroshi Hinohara, Kanagawa (JP); Takeshi Homma, Kanagawa (JP)

(72) Inventors: Yuichi Kawasaki, Kanagawa (JP); Shigeru Nakamura, Kanagawa (JP); Masashi Ogasawara, Kanagawa (JP); Atsushi Miyamoto, Kanagawa (JP); Hiroshi Hinohara, Kanagawa (JP); Takeshi Homma, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 16/802,586

(22) Filed: Feb. 27, 2020

(65) Prior Publication Data
US 2020/0278823 A1 Sep. 3, 2020

(30) Foreign Application Priority Data

Feb. 28, 2019 (JP) .............................. JP2019-037045
Jan. 24, 2020 (JP) .............................. JP2020-010378

(51) Int. Cl.
*G06F 3/14* (2006.01)
*H04L 29/06* (2006.01)

(52) U.S. Cl.
CPC ........ *G06F 3/1454* (2013.01); *H04L 65/4015* (2013.01)

(58) Field of Classification Search
CPC ............... G06F 3/1454; G06F 3/04883; H04L 65/4015; G09G 2340/04; H04Q 2213/13174
See application file for complete search history.

(56) References Cited

U.S. PATENT DOCUMENTS 6,408,058 B1 6/2002 Lanet
8,964,713 B2 2/2015 Hinohara et al.
(Continued)

FOREIGN PATENT DOCUMENTS

JP 2001-265638 9/2001
JP 2001-523071 11/2001
JP 6115194 4/2017

OTHER PUBLICATIONS

U.S. Appl. No. 16/519,216, filed Jul. 23, 2019.

*Primary Examiner* — Ibrahim A Khan
(74) *Attorney, Agent, or Firm* — Xsensus LLP

(57) ABSTRACT

A screen sharing system is configured to perform screen sharing between a first information processing apparatus and a second information processing apparatus. The first information processing apparatus is configured to acquire, as screen-sharing information, an image displayed on the first information processing apparatus, and transmit the screen-sharing information to a first server, when a data amount of the screen-sharing information is below a threshold value, and transmit the screen-sharing information to a second server and transmit, to the first server, storage destination information indicating a storage destination of the screen-sharing information, when the data is greater than or equal to the threshold value. The second information processing is configured to display, on the second information processing apparatus, an image based on the screen-sharing information received from the first server, or received from the second server based on the storage destination information received from the first server.

9 Claims, 11 Drawing Sheets

(56) References Cited

U.S. PATENT DOCUMENTS

| | | |
|---|---|---|
| 9,652,082 B1* | 5/2017 | Lin .................... G06F 3/0421 |
| 10,067,756 B2 | 9/2018 | Tamura et al. |
| 10,177,864 B2 | 1/2019 | Nagase et al. |
| 10,277,644 B2 | 4/2019 | Shiro et al. |
| 10,397,638 B2* | 8/2019 | Kanematsu ............. G09G 5/37 |
| 10,417,219 B1* | 9/2019 | Yang .................... H04L 9/0643 |
| 10,691,638 B1* | 6/2020 | Lyadvinsky .......... G06F 3/0622 |
| 10,853,315 B1* | 12/2020 | Faibish ................ G06F 16/137 |
| 2006/0098004 A1* | 5/2006 | Cok ...................... G06F 3/0412 345/207 |
| 2007/0083575 A1* | 4/2007 | Leung .................. G06F 16/122 |
| 2007/0280219 A1 | 12/2007 | Shimizu et al. |
| 2011/0065424 A1* | 3/2011 | Estevez ................ H04W 48/18 455/414.3 |
| 2012/0098733 A1* | 4/2012 | Masuda ................ G06F 3/0481 345/2.2 |
| 2012/0221715 A1* | 8/2012 | Hamada ................ H04L 67/22 709/224 |
| 2013/0007579 A1* | 1/2013 | Dancy .................... G06Q 50/01 715/205 |
| 2013/0250354 A1* | 9/2013 | Kato .................... H04N 1/0044 358/1.15 |
| 2013/0254314 A1* | 9/2013 | Chow ................... G06F 16/957 709/206 |
| 2014/0032735 A1* | 1/2014 | Kapoor ................ G06F 3/1454 709/224 |
| 2014/0152761 A1 | 6/2014 | Homma |
| 2014/0240441 A1 | 8/2014 | Hinohara et al. |
| 2014/0240449 A1 | 8/2014 | Hinohara et al. |
| 2014/0362404 A1* | 12/2014 | Miyasaka ............. G06F 3/1238 358/1.15 |
| 2015/0042749 A1 | 2/2015 | Homma |
| 2015/0092233 A1* | 4/2015 | Park ................... H04N 1/00307 358/1.15 |
| 2015/0109403 A1* | 4/2015 | Krishnan ............... H04N 7/155 348/14.08 |
| 2015/0237089 A1 | 8/2015 | Hinohara et al. |
| 2015/0264311 A1 | 9/2015 | Hinohara et al. |
| 2015/0302026 A1* | 10/2015 | Nam ..................... G06F 16/119 707/827 |
| 2015/0309765 A1* | 10/2015 | Nagahara ................ H04N 7/15 345/2.2 |
| 2016/0050263 A1* | 2/2016 | Hwang ................... H04L 67/10 709/206 |
| 2016/0065633 A1* | 3/2016 | Kawakubo .......... H04L 65/4038 715/753 |
| 2016/0156684 A1 | 6/2016 | Hinohara et al. |
| 2016/0205345 A1 | 7/2016 | Homma et al. |
| 2016/0210306 A1* | 7/2016 | Kumarasamy ........ G06F 16/178 |
| 2016/0227381 A1* | 8/2016 | Bargetzi ............. H04L 12/1822 |
| 2016/0231997 A1 | 8/2016 | Mihara et al. |
| 2016/0234263 A1 | 8/2016 | Nakamura |
| 2016/0269329 A1* | 9/2016 | Willis ..................... H04L 51/08 |
| 2016/0373692 A1 | 12/2016 | Miyamoto |
| 2017/0034476 A1 | 2/2017 | Homma et al. |
| 2017/0064251 A1 | 3/2017 | Soneda et al. |
| 2017/0094224 A1* | 3/2017 | Hasegawa ................ H04N 7/15 |
| 2017/0171513 A1 | 6/2017 | Nakamura |
| 2017/0187990 A1 | 6/2017 | Hasegawa et al. |
| 2017/0237871 A1* | 8/2017 | Fan .................... H04N 1/00212 358/1.13 |
| 2017/0257402 A1 | 9/2017 | Umehara et al. |
| 2017/0318115 A1* | 11/2017 | Peng .................. H04L 67/2842 |
| 2017/0374111 A1 | 12/2017 | Hinohara et al. |
| 2018/0027030 A1 | 1/2018 | Homma et al. |
| 2018/0095711 A1 | 4/2018 | Kanda et al. |
| 2018/0109758 A1 | 4/2018 | Homma et al. |
| 2019/0013956 A1 | 1/2019 | Soneda et al. |
| 2019/0082144 A1 | 3/2019 | Hakata et al. |
| 2019/0098211 A1 | 3/2019 | Ohmura et al. |
| 2019/0098253 A1 | 3/2019 | Soneda et al. |
| 2019/0265941 A1* | 8/2019 | Baba ..................... G06F 3/1454 |
| 2019/0306004 A1 | 10/2019 | Hakata et al. |
| 2019/0306201 A1 | 10/2019 | Ohmura et al. |
| 2019/0306421 A1 | 10/2019 | Takeda et al. |

\* cited by examiner

SCREEN SHARING SYSTEM, AND INFORMATION PROCESSING APPARATUS

CROSS-REFERENCE TO RELATED APPLICATIONS

The present application claims priority under 35 U.S.C. § 119 to Japanese Patent Application No. 2019-037045, filed on Feb. 28, 2019 and Japanese Patent Application No. 2020-010378, filed on Jan. 24, 2020. The contents of which are incorporated herein by reference in their entirety.

BACKGROUND OF THE INVENTION

1. Field of the Invention

The present invention relates to a screen sharing system, and an information processing apparatus.

2. Description of the Related Art

In recent years, systems for holding a meeting and the like via a communication network such as the Internet have become widely used. In such a system, by transmitting and receiving among information processing apparatuses, in addition to audio data acquired by a sound collection device such as a microphone and image data acquired by an imaging device such as a camera, an image displayed on a display screen of an image display device, sharing of a screen is performed. For example, by sharing a screen of an image written by hand (handwritten image), communication among users in remote locations can be improved.

As for the above-described screen sharing, various technologies have been developed. For example, Japanese Patent No. 6115194 describes the performing of queuing control so that, when sharing a background image together with a handwritten image, the image that is input later is not displayed first on a display screen.

However, with the above-described technology, there is the problem that the configuration concerning the queuing control is complicated. In addition, it is configured such that the images are displayed in order of being input, and thus when an image for which the data size is large is included in the input images, even if the data size of an image subsequently input is significantly small, it takes time until the relevant image is displayed.

SUMMARY OF THE INVENTION

According to an aspect of the present invention, a screen sharing system is configured to perform screen sharing between a first information processing apparatus and a second information processing apparatus connected via a network. The first information processing apparatus includes an acquisition unit, a first transmission unit, and a second transmission unit. The acquisition unit is configured to acquire, as screen-sharing information, an image displayed on a display screen of the first information processing apparatus. The first transmission unit is configured to transmit the screen-sharing information to a first server connected to the network, when a data amount of the screen-sharing information is below a threshold value. The second transmission unit is configured to transmit the screen-sharing information to a second server connected to the network and to transmit, to the first server, storage destination information indicating a storage destination of the screen-sharing information in the second server, when the data amount of the screen-sharing information is greater than or equal to the threshold value. The second information processing apparatus includes a first receiving unit, a second receiving unit, and a display controller. The first receiving unit is configured to receive, from the first server, the screen-sharing information or the storage destination information that the first information processing apparatus has transmitted. The second receiving unit is configured to receive, based on the storage destination information received by the first receiving unit, the screen-sharing information from the second server. The display controller is configured to display, on a display screen of the second information processing apparatus, an image based on the screen-sharing information received by the first receiving unit or the second receiving unit.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENT

Figure 1:
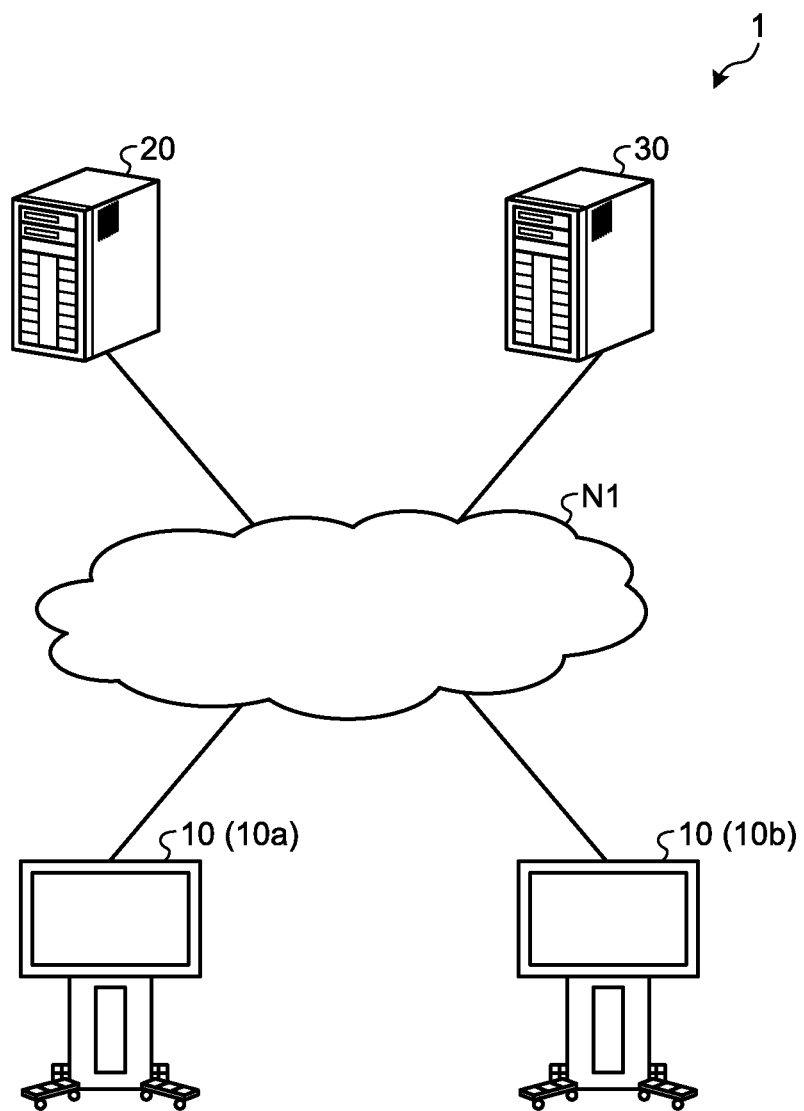
FIG. 1 is a diagram illustrating one example of a system configuration of a screen sharing system according to an embodiment.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a screen sharing system, and an information processing apparatus capable of efficiently performing screen sharing among information processing apparatuses.

With reference to the accompanying drawings, the following describes in detail an exemplary embodiment of a screen sharing system, an information processing apparatus, a screen sharing method, and a computer program according to the present invention.

FIG. 1 is a diagram illustrating one example of a system configuration of a screen sharing system 1 according to the embodiment. The screen sharing system 1 in the present embodiment includes image display devices 10 (10a, 10b), a management server 20, and a storage server 30. In such a screen sharing system 1, the image display devices 10, the management server 20, and the storage server 30 are connected so as to be able to perform communication via a communication network N1 such as the Internet. The number of image display devices 10 connected to the communication network N1 is not limited to that of the example of FIG. 1.

The image display device 10 is one example of an information processing apparatus. The image display device 10 establishes communication (session) among other devices connected to the communication network N1 and performs transmitting and receiving of various data. Specifically, the image display devices 10 perform, by transmitting and receiving various data via the communication network N1, screen sharing in which a screen displayed on the image display device 10 of a screen-sharing source is displayed on the screen of the image display device 10 of a screen-sharing destination. In the present embodiment, it is assumed that the image display device 10a is the screen-sharing source and the image display device 10b is the screen-sharing destination.

The management server 20 is one example of a first server and manages data transmitted and received between the image display devices 10. The storage server 30 is one example of a second server and stores therein screen-sharing information exchanged between the image display devices 10.

Figure 2:
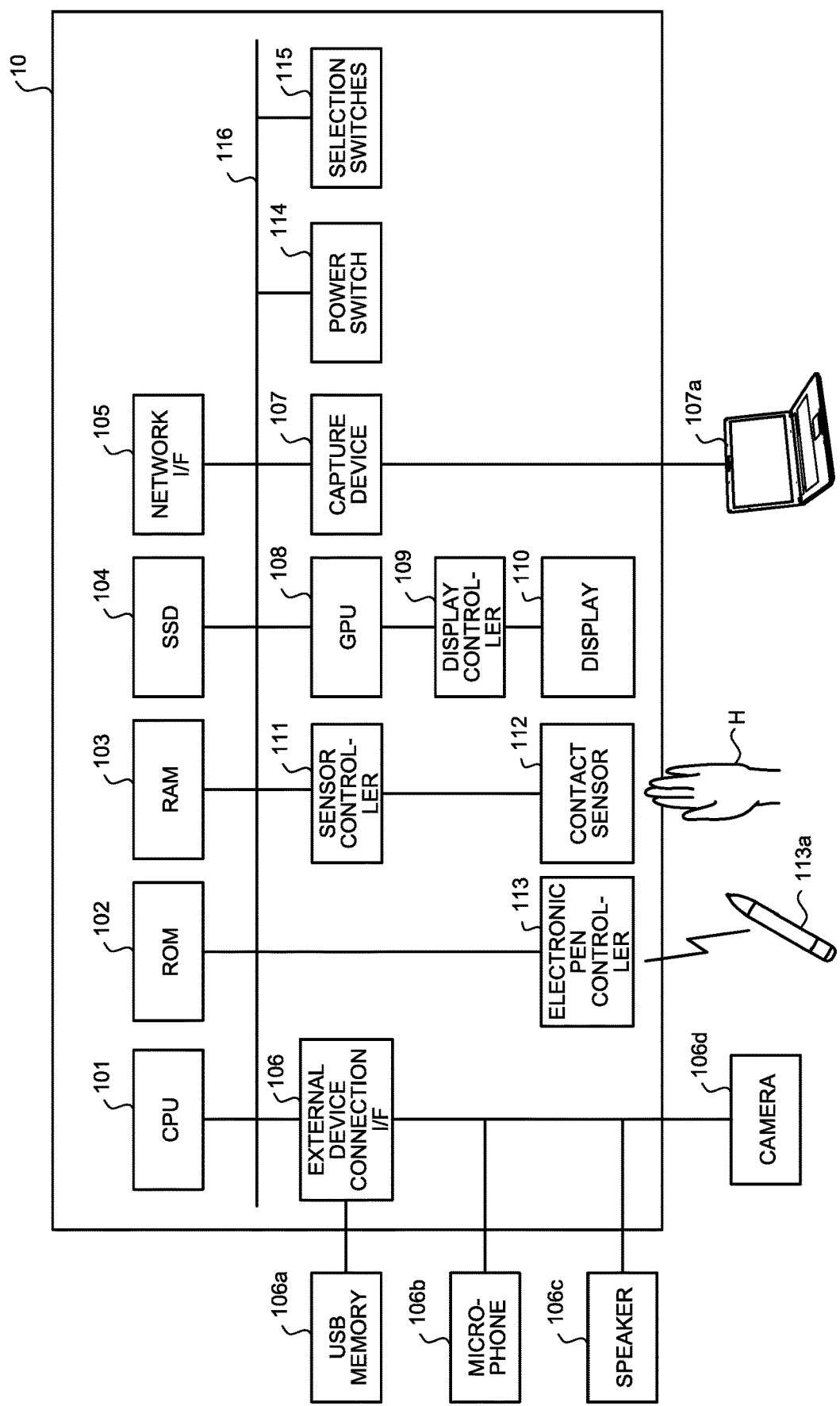
FIG. 2 is a diagram illustrating one example of a hardware configuration of an image display device in the embodiment.

FIG. 2 is a diagram illustrating one example of a hardware configuration of the image display device 10. As illustrated in FIG. 2, the image display device 10 includes a CPU (central processing unit) 101, a ROM (read-only memory) 102, a RAM (random access memory) 103, an SSD (solid-state drive) 104, a network I/F 105, and an external device connection I/F (interface) 106.

The CPU 101 controls the operation of the entire image display device 10. The ROM 102 stores therein a computer program used to drive the CPU 101 such as an IPL (initial program loader). The RAM 103 is used as a work area of the CPU 101. The SSD 104 stores therein various data such as computer programs that the CPU 101 executes. The network I/F 105 controls communication with the communication network N1. The external device connection I/F 106 is an interface for connecting various external devices. The external devices, in this case, are a USB (universal serial bus) memory 106a and external devices (a microphone 106b, a speaker 106c, a camera 106d), for example.

The image display device 10 includes a capture device 107, a GPU (graphics processing unit) 108, a display controller 109, a display 110, a sensor controller 111, a contact sensor 112, an electronic pen controller 113, a power switch 114, selection switches 115, and the like.

The capture device 107 acquires a still picture or a moving image displayed on a display of a PC (personal computer) 107a as a background image. The GPU 108 is a semiconductor chip that specializes in graphics. The display controller 109 performs control and management of screen display in order to output, to the display 110 and the like, an output image from the GPU 108.

The contact sensor 112 detects that an electronic pen 113a, a hand H of the user, and the like made a contact with the display 110. The sensor controller 111 controls the processing of the contact sensor 112. The contact sensor 112 performs the input of coordinates by an infrared blocking system and the detection of the coordinates. The method of inputting the coordinates and detecting the coordinates is a method in which two light emitting/receiving devices installed on both upper-end sides of the display 110 emit a plurality of infrared rays in parallel with the display 110 and the light-receiving elements receive the light that was reflected by reflection members provided on the periphery of the display 110 and returned on the same optical path as the light path of the emitted light. The contact sensor 112 outputs to the sensor controller 111 the ID of the infrared rays that were emitted by the two light-emitting/receiving devices and were blocked by an object, and the sensor controller 111 identifies the coordinate position that is the contact location of the object.

The electronic pen controller 113 determines, by performing communication with the electronic pen 113a, the presence of touching of the pen point or the pen bottom to the display 110. The power switch 114 is a switch to switch on/off of the power supply of the image display device 10. The selection switches 115 are a group of switches for adjusting the brightness, hue, and the like of the display on the display 110, for example.

In addition, the image display device 10 includes a bus line 116. The bus line 116 is an address bus, a data bus, or the like for electrically connecting various constituent elements such as the CPU 101 illustrated in FIG. 2.

The contact sensor 112 is not limited to the infrared blocking method, and various detecting units such as a touch panel of capacitive sensing method that identifies the contact location by detecting changes in capacitance, a touch panel of resistive membrane method that identifies the contact location by voltage changes of two opposing resistive films, and a touch panel of electromagnetic induction method that identifies the contact location by detecting electromagnetic induction resulting from the contact of a contacting object with the display unit may be used. In addition, the electronic pen controller 113 may determine the presence of not only touching of the pen point or the pen bottom of the electronic pen 113a but also touching of a portion of the electronic pen 113a at which the user grips or other portions of the electronic pen.

The image display device 10 is configured so as to be able to display an image (background image) input from the PC 107a on the display screen of the display 110. The image display device 10 is further configured to receive a hand-written input of the user via the contact sensor 112. For example, the image display device 10 responds to the user moving the pen point of the electronic pen 113a while contacting the display 110. Then, the image display device 10 is configured so as to display a drawing line corresponding to the movement trajectory thereof on the display screen of the display 110. This allows the user of the image display device 10 to freely write handwritten images such as characters and graphics on the background image displayed on the display screen of the display 110.

Figure 3:
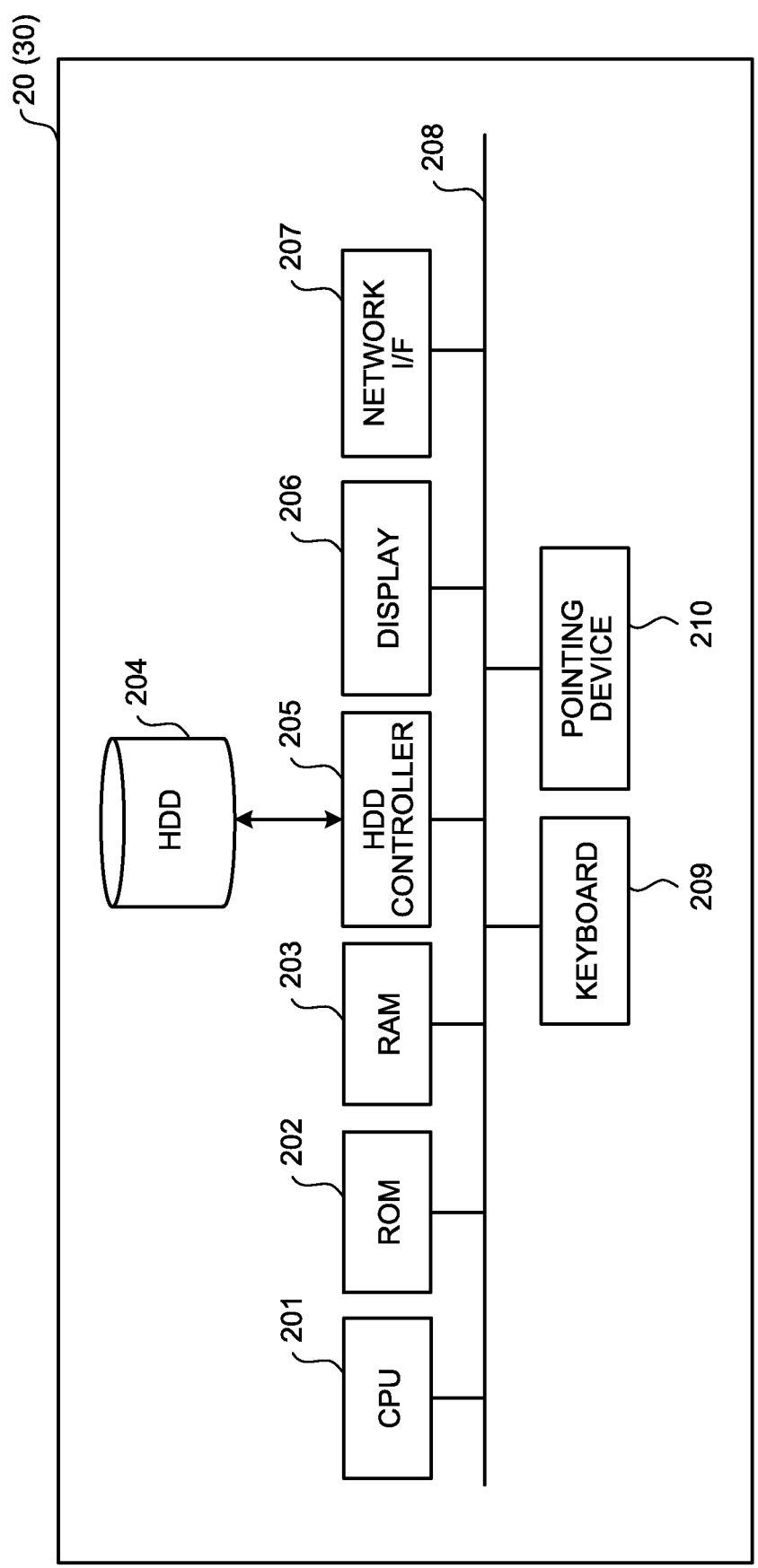
FIG. 3 is a diagram illustrating one example of a hardware configuration of a management server in the embodiment.

FIG. 3 is a diagram illustrating one example of a hardware configuration of the management server 20. The hardware configuration of the storage server 30 also is the same as the hardware configuration of this management server 20. Thus, for the hardware configuration of the storage server 30, see the following description of the hardware configuration of the management server 20.

As illustrated in FIG. 3, the management server 20 includes a CPU 201, a ROM 202, a RAM 203, an HDD (hard disk drive) 204, an HDD controller 205, a display 206, a network I/F 207, a bus line 208, a keyboard 209, and a pointing device 210.

The CPU 201 controls the operation of the entire management server 20. The ROM 202 stores therein a computer program used to drive the CPU 201 such as an IPL. The RAM 203 is used as a work area of the CPU 201. The HDD 204 stores therein various data such as computer programs. The HDD controller 205 controls the reading and writing of various data for the HDD 204 in accordance with the control of the CPU 201. The display 206 displays various information and data such as cursors, menus, windows, characters, and images. The network I/F 207 is an interface for performing data communication by utilizing the communication network N1. The bus line 208 is an address bus, a data bus, or the like for electrically connecting the various constituent elements such as the CPU 201.

The keyboard 209 is one type of an input unit provided with a plurality of keys for inputting characters, numerical values, various instructions, or the like. The pointing device 210 is one type of an input unit that performs the selection and execution of various instructions, selection of processing targets, moving of the cursor, and the like.

In the configuration of the above-described screen sharing system 1, the image display device 10 has a screen-sharing function that transfers and displays an image displayed on the display screen of the display 110 to the other image display device 10 placed in a remote location. This enables the screen sharing system 1 to hold a meeting or perform presentation while sharing with the image display device 10b at a remote location a handwritten image that is input (displayed) to the display 110 of the image display device 10a.

Incidentally, in the case where the image display devices 10 are connected via a communication network of low bandwidth, depending on the data amount of data that the image display device 10 of a transmission source transmits, a delay in data transfer via the communication network N1 may occur.

For example, when a handwritten line is copied multiple times or when a page in which a plurality of handwritten lines are stored is read out, the handwritten lines of a large data amount may be drawn at one time. As in the foregoing, in the case where a handwritten image of a large data amount is input, when the relevant handwritten image is transmitted to the image display device 10b, a delay of a handwritten image input subsequent to that in reaching the image display device 10b may occur. When such a delay occurs, in the image display device 10 of the screen-sharing destination, it is not possible to understand whether an additional handwritten input is made on the image display device 10 of the screen-sharing source before the handwritten image of a large data amount is displayed, and it may interfere with interaction between the users.

Figure 4:
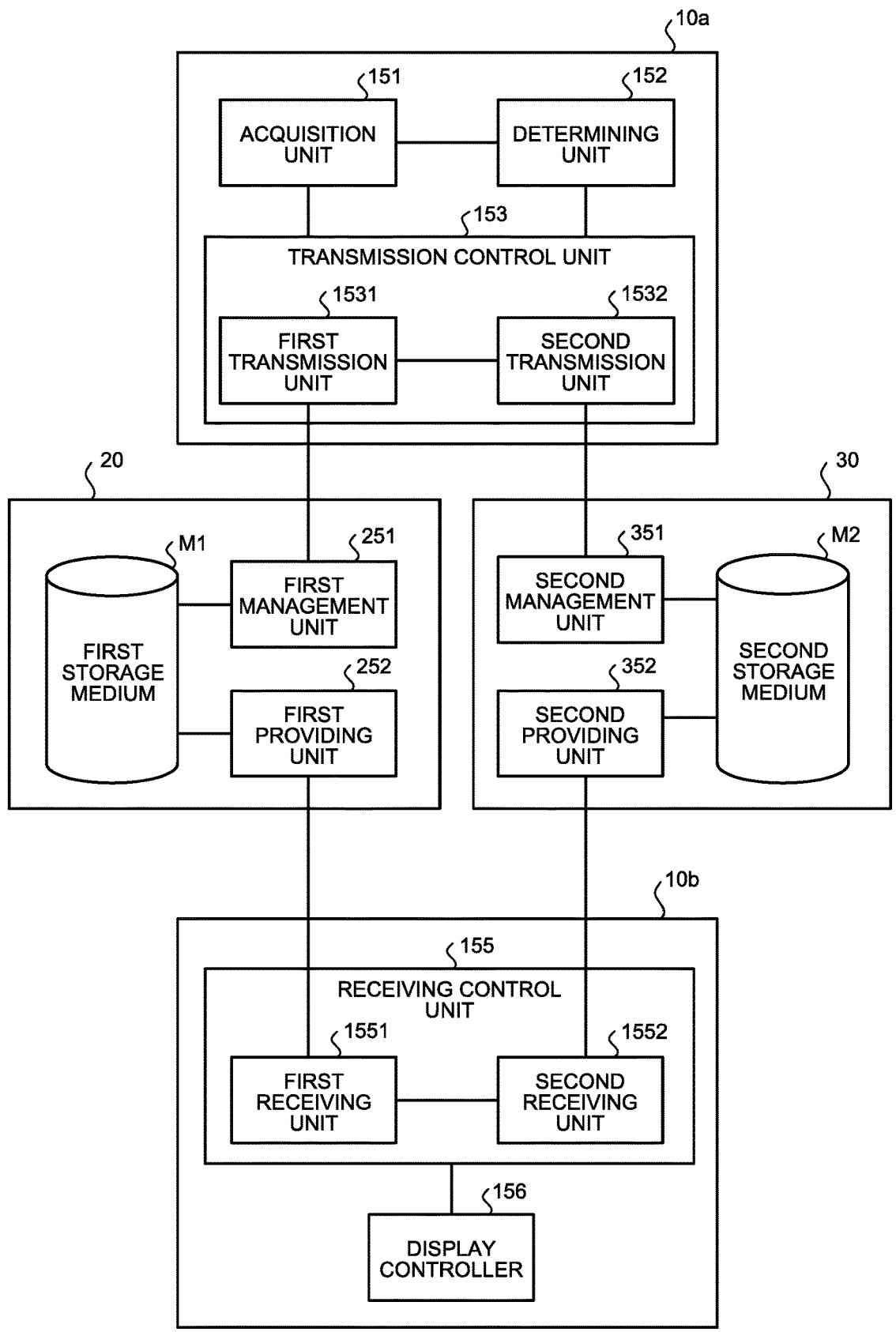
FIG. 4 is a diagram illustrating one example of functional configurations of the image display devices, the management server, and a storage server in the embodiment.

Consequently, in the screen sharing system 1 of the present embodiment, in order to improve the above-described problems, the respective devices of the image display devices 10, the management server 20, and the storage server 30 are provided with the functional configurations illustrated in FIG. 4. FIG. 4 is a diagram illustrating one example of the functional configurations of the image display devices 10, the management server 20, and the storage server 30.

First, the functional configuration of the image display device 10a of the screen-sharing source will be described. As illustrated in FIG. 4, the image display device 10a includes, as a functional configuration, an acquisition unit 151, a determining unit 152, and a transmission control unit 153.

The acquisition unit 151 acquires an image displayed on the display screen of the display 110 of the image display device 10a as screen-sharing information. Specifically, the acquisition unit 151, when a handwritten image is input (displayed) to the display screen of the display 110 via the contact sensor 112 or the electronic pen 113a, acquires the information that represents the relevant handwritten image as the screen-sharing information. The screen-sharing information includes information that enables display to be made in the same state as that of the screen-sharing source such as the location (for example, coordinates or the like) of the handwritten image in the display screen of the display 110 and the information representing the shape and the color thereof (for example, vector data and selected color).

The unit of capturing as the screen-sharing information does not matter in particular, and it can be set discretionarily. For example, the acquisition unit 151 may acquire the handwritten image that is input in a single operation as a single piece of screen-sharing information. Furthermore, for example, the acquisition unit 151 may acquire, as a single piece of screen-sharing information, a handwritten image that is input within a predetermined time period from the timing at which inputting the handwritten image is started.

The image that the acquisition unit 151 acquires as the screen-sharing information is not limited to the handwritten image and may acquire the background image displayed on the display screen of the display 110 as the screen-sharing information. In this case, the acquisition unit 151 acquires the handwritten image and the background image as separate screen-sharing information.

The determining unit 152 determines whether the data amount of the screen-sharing information acquired by the acquisition unit 151 is greater than or equal to a threshold value. The threshold value can be set discretionary, but it can be set automatically or manually depending on the bandwidth (communication speed) of the communication between the image display device 10a and the image display device 10b.

The transmission control unit 153 switches the transmission destination of the screen-sharing information depending on the determination result of the determining unit 152. Specifically, the transmission control unit 153 includes a first transmission unit 1531 and a second transmission unit 1532, and by the functions of these transmission units, transmits the screen-sharing information to the transmission destination according to the determination result of the determining unit 152.

The first transmission unit 1531, when the data amount of the screen-sharing information is below the threshold value, provides the screen-sharing information to the image display device 10b via the management server 20 by transmitting the relevant screen-sharing information to the management server 20.

The second transmission unit 1532, when the data amount of the screen-sharing information is greater than or equal to the threshold value, transmits the relevant screen-sharing information to the storage server 30. In addition, the second transmission unit 1532, in collaboration with the first transmission unit 1531, provides storage destination information indicating the storage destination of the screen-sharing information in the storage server 30 to the image display device 10b via the management server 20. In the present embodiment, the storage destination information is notified from the storage server 30, but the embodiments may be in a form where the second transmission unit 1532 determines the storage destination in the storage server 30.

Next, the functional configuration of the management server 20 will be described. As illustrated in FIG. 4, the management server 20 includes, as a functional configuration, a first management unit 251 and a first providing unit 252.

The first management unit 251 receives the screen-sharing information or the storage destination information transmitted from the first transmission unit 1531 of the transmission control unit 153 in the image display device 10a and stores the received information in a first storage medium M1 that the management server 20 includes, such as the RAM and HDD. It is assumed that the first management unit 251 stores the information in order of receiving from the image display device 10a.

The first providing unit 252 provides the information stored in the first storage medium M1 to the image display device 10b of the screen-sharing destination. The providing method of the information does not matter in particular, and various methods can be employed. For example, the first providing unit 252 may, each time new screen-sharing information or the storage destination information is stored in the first storage medium M1, provide the relevant new information to the image display device 10b. In addition, for example, the first providing unit 252 may, in response to the request from the image display device 10b, provide in sequence the information stored in the first storage medium M1 in a FIFO (first-in, first-out) format. In the present embodiment, the information is provided to the image display device 10b in the former providing method, but in this case, it may be configured to transmit the information in sequence in a stream format such as a media stream without going through the first storage medium M1.

Next, the functional configuration of the storage server 30 will be described. As illustrated in FIG. 4, the storage server 30 includes, as a functional configuration, a second management unit 351 and a second providing unit 352.

The second management unit 351 receives the screen-sharing information transmitted from the second transmission unit 1532 of the transmission control unit 153 in the image display device 10a and stores the received screen-sharing information in a second storage medium M2 that the storage server 30 includes, such as the RAM and HDD. In addition, the second management unit 351, upon storing the screen-sharing information in the second storage medium M2, notifies the image display device 10a of the storage destination information indicating the storage destination thereof. The storage destination information is, for example, an address such as a URL (uniform resource locator) and is the information by which downloading the corresponding screen-sharing information is possible.

The timing that the second management unit 351 gives notice of the storage destination information does not matter in particular. For example, the second management unit 351 may give notice at the timing of completing the storage of the screen-sharing information. The second management unit 351 may give notice at the timing of starting the storing of the screen-sharing information.

The second providing unit 352 provides the screen-sharing information stored in the second storage medium M2 to the image display device 10b to be the screen-sharing destination. Specifically, the second providing unit 352, upon receiving a download request based on the storage destination information from the image display device 10b, provides the screen-sharing information stored in the storage destination indicated in the storage destination information to the image display device 10b.

Next, the functional configuration of the image display device 10b of the screen-sharing destination will be described. As illustrated in FIG. 4, the image display device 10b includes, as a functional configuration, a receiving control unit 155 and a display controller 156.

The receiving control unit 155 receives the screen-sharing information transmitted from the image display device 10 via the management server 20 or the storage server 30. Specifically, the receiving control unit 155 includes a first receiving unit 1551 and a second receiving unit 1552, and by the functions of these receiving units, receives the screen-sharing information transmitted from the image display device 10 via the management server 20 or the storage server 30.

The first receiving unit 1551 receives the screen-sharing information or the storage destination information provided from the management server 20. The method that the first receiving unit 1551 receives the information from the management server 20 does not matter in particular, and various methods can be employed. For example, the first receiving unit 1551 may receive the information transmitted from the management server 20, by requesting the management server 20 to provide the information as needed or on a regular basis. In addition, for example, the first receiving unit 1551 may receive the information unilaterally transmitted from the management server 20.

The second receiving unit 1552 receives (downloads), by accessing the storage server 30 based on the storage destination information received by the first receiving unit 1551, the screen-sharing information corresponding to the relevant storage destination information from the storage server 30. The method that the second receiving unit 1552 receives the screen-sharing information from the storage server 30 does not matter in particular, and various methods can be employed. For example, when the first receiving unit 1551 receives the storage destination information, the second receiving unit 1552 may, by automatically accessing the address indicated in the relevant storage destination information, receive the appropriate screen-sharing information from the storage server 30. Furthermore, for example, when the second receiving unit 1552 is instructed to access the address that the storage destination information indicates by the user, the second receiving unit 1552 may, by accessing the relevant address, receive the appropriate screen-sharing information from the storage server 30.

The display controller 156 displays, based on the screen-sharing information received in the receiving control unit 155 (the first receiving unit, the second receiving unit), the handwritten image that the screen-sharing information represents, on the display screen of the display 110. Specifically, the display controller 156 reproduces on the display screen of the display 110 the handwritten image based on the coordinate information, vector data, or the like included in the screen-sharing information. As a result, the display controller 156 displays the handwritten image on the display 110 of the image display device 10b in the same state as that of the handwritten image displayed on the display 110 of the image display device 10a.

In addition, when the first receiving unit 1551 receives the storage destination information, the display controller 156 displays notification information on the display screen of the display 110. In this case, the display form of the notification information does not matter in particular, and various forms can be employed. For example, the display controller 156 may display on the display screen of the display 110 the storage destination information itself (URL and the like) or an operator element that indicates accessing the storage destination that the storage destination information indicates, as the notification information. In this case, the second receiving unit 1552 may determine that, when a touch operation is made to the notification information displayed on the display screen of the display 110, the instruction to access the address that the storage destination information indicates has been issued. In addition, the display controller 156 may display, on the display screen of the display 110, a message, an icon, or the like that gives notice of the presence of screen-sharing information (handwritten image) not yet displayed, as the notification information.

In FIG. 4, although the functional configurations of the image display device 10a and the image display device 10b have been described separately, a single image display device 10 may be configured to have the functional configurations of the image display device 10a and the image display device 10b. That is, when the image display device 10 has both functions of the screen-sharing source and the screen-sharing destination, the relevant image display device 10 includes the functional configurations of the image display device 10a and the image display device 10b illustrated in FIG. 4.

Next, the operation of the above-described screen sharing system 1 will be described. First, with reference to FIG. 5 and FIG. 6, an operation example when the screen-sharing information is provided via the management server 20 will be described.

Figure 5:
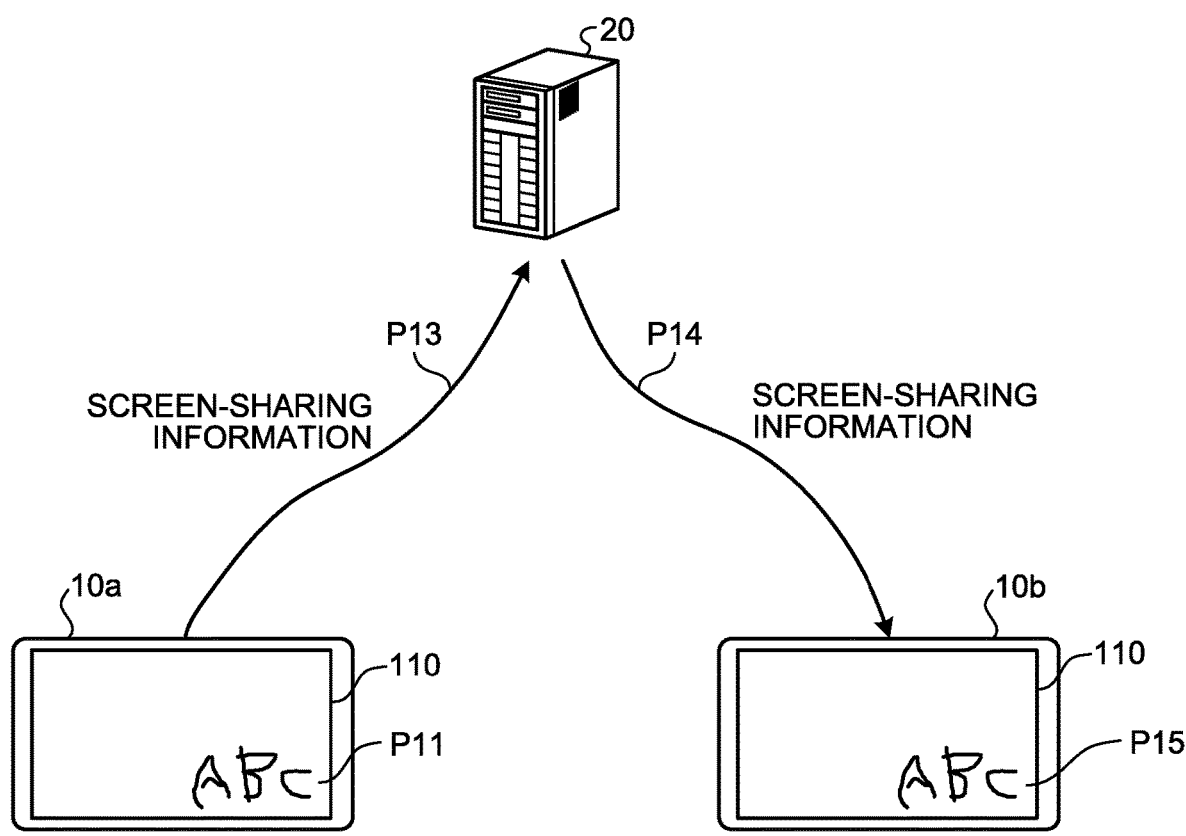
FIG. 5 is a diagram schematically illustrating the flow of information when providing screen-sharing information via the management server of the embodiment.
Figure 6:
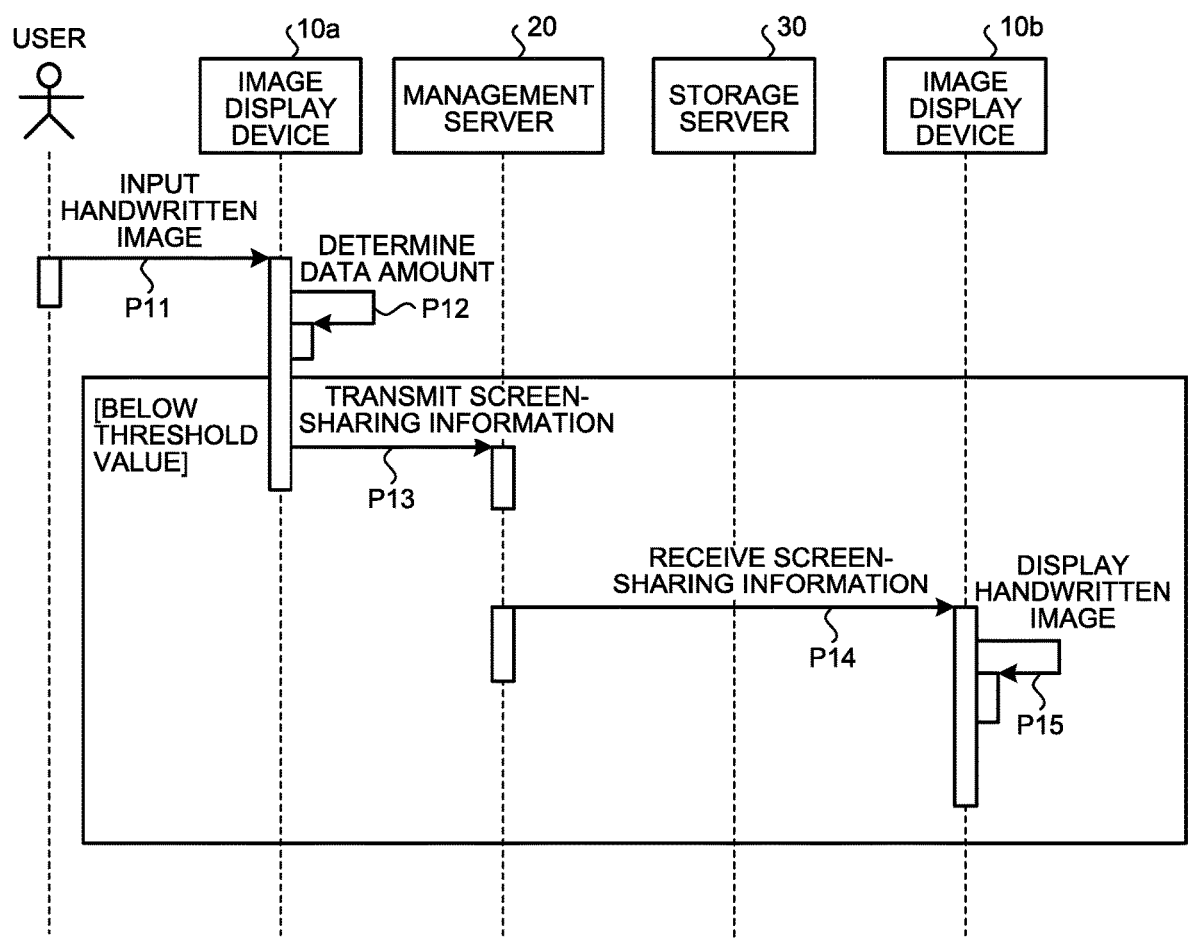
FIG. 6 is a sequence diagram illustrating an operation example when providing the screen-sharing information via the management server of the embodiment.

FIG. 5 is a diagram schematically illustrating the flow of information when providing the screen-sharing information via the management server 20. FIG. 6 is a sequence diagram illustrating an operation example when providing the screen-sharing information via the management server 20.

First, in the image display device 10a of the screen-sharing source, when an input of a handwritten image is made by the user (symbol P11), the acquisition unit 151 of the image display device 10a acquires the input handwritten image as the screen-sharing information. Then, the determining unit 152 of the image display device 10a determines the data amount of the screen-sharing information acquired by the acquisition unit 151 (symbol P12). When the data amount of the screen-sharing information is below the threshold value, the transmission control unit 153 (the first transmission unit 1531) of the image display device 10a transmits the screen-sharing information to the management server 20 (symbol P13).

In the management server 20, when the first management unit 251 stores in the first storage medium M1 the screen-sharing information transmitted from the image display device 10a, the first providing unit 252 provides the screen-sharing information stored in the first storage medium M1 to the image display device 10b.

Meanwhile, in the image display device 10b of the screen-sharing destination, the receiving control unit 155 (the first receiving unit 1551) receives the screen-sharing information provided from the management server 20 (symbol P14). Then, the display controller 156 of the image display device 10b reproduces the same screen as that of the image display device 10a, by displaying on the display 110 the handwritten image based on the screen-sharing information provided from the management server 20 (symbol P15).

Figure 7:
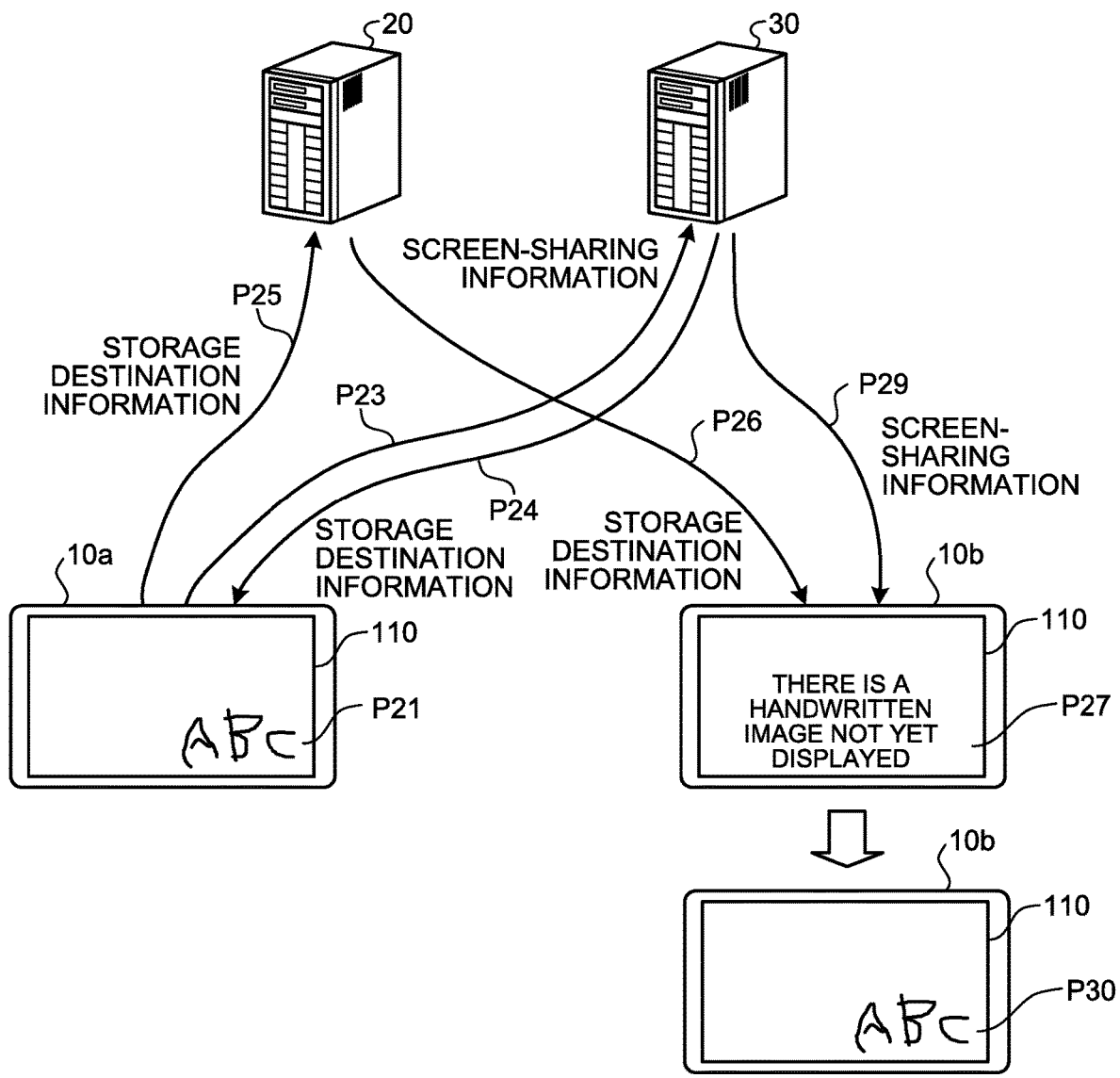
FIG. 7 is a diagram schematically illustrating the flow of information when providing the screen-sharing information via the storage server in the embodiment.
Figure 8:
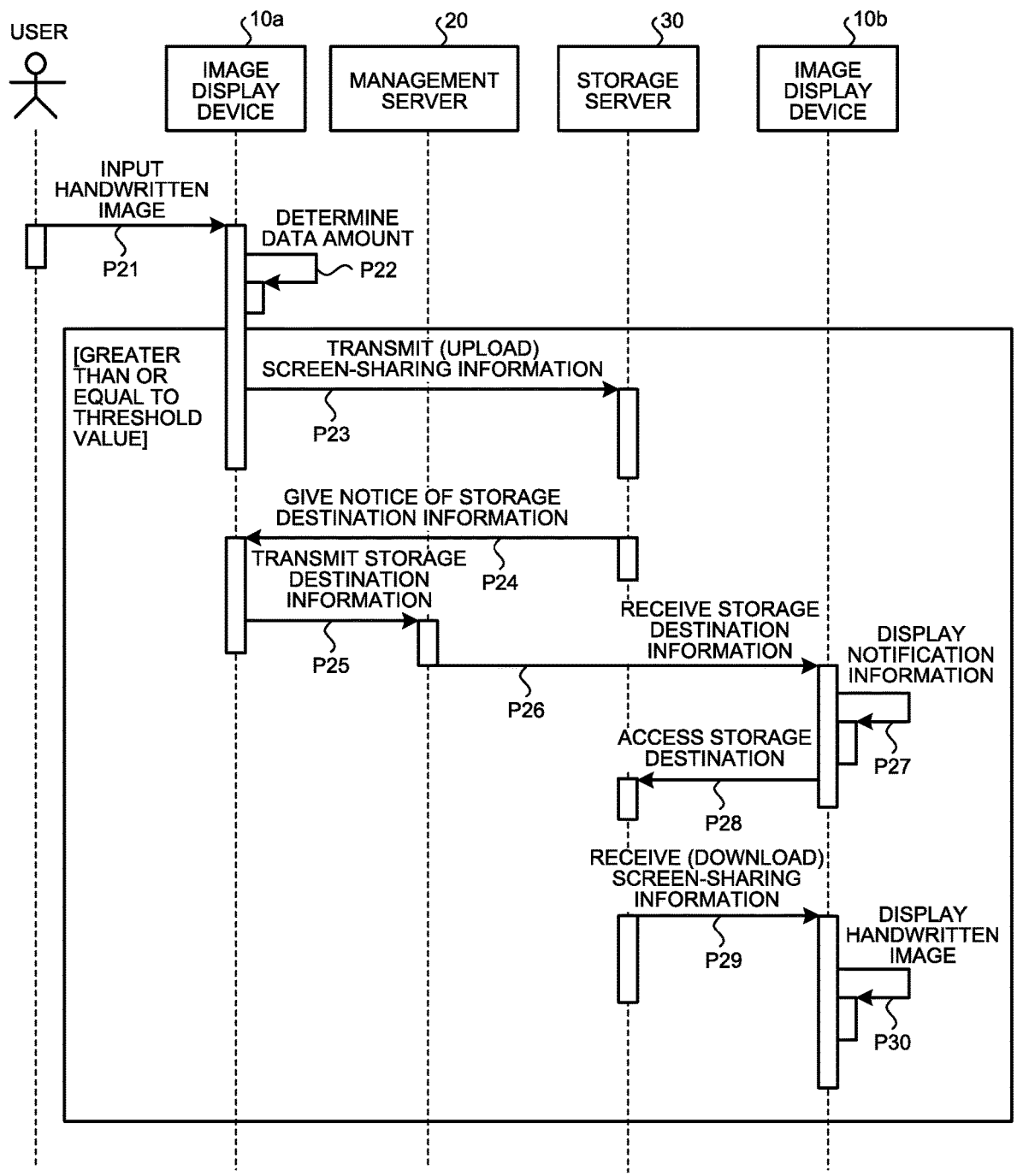
FIG. 8 is a sequence diagram illustrating an operation example when providing the screen-sharing information via the storage server in the embodiment.

Next, with reference to FIG. 7 and FIG. 8, an operation example when the screen-sharing information is provided via the storage server 30 will be described. FIG. 7 is a diagram schematically illustrating the flow of information when providing the screen-sharing information via the storage server 30. FIG. 8 is a sequence diagram illustrating an operation example when providing the screen-sharing information via the storage server 30.

First, in the image display device 10a of the screen-sharing source, when an input of a handwritten image is made by the user (symbol P21), the acquisition unit 151 of the image display device 10a acquires the input handwritten image as the screen-sharing information. Then, the determining unit 152 of the image display device 10a determines the data amount of the screen-sharing information acquired by the acquisition unit 151 (symbol P22). When the data amount of the screen-sharing information is greater than or equal to the threshold value, the transmission control unit 153 (the second transmission unit 1532) of the image display device 10a transmits (uploads) the screen-sharing information to the storage server 30 (symbol P23).

In the storage server 30, the second management unit 351, upon storing in the second storage medium M2 the screen-sharing information transmitted from the image display device 10a, notifies the image display device 10a of the storage destination information indicating the storage destination thereof (symbol P24). The transmission control unit 153 (the second transmission unit 1532) of the image display device 10a, upon receiving the storage destination information notified from the storage server 30, transmits the relevant storage destination information to the management server 20 (symbol P25).

In the management server 20, when the first management unit 251 stores in the first storage medium M1 the storage destination information transmitted from the image display device 10a, the first providing unit 252 provides the storage destination information stored in the first storage medium M1 to the image display device 10b.

Meanwhile, in the image display device 10b of the screen-sharing destination, when the receiving control unit 155 (the second receiving unit 1552) receives the storage destination information provided from the management server 20 (symbol P26), the display controller 156 displays notification information on the display 110 (symbol P27). FIG. 7 illustrates an example displaying that, as the notification information, there is screen-sharing information (handwritten image) not yet displayed.

Subsequently, the receiving control unit 155 (the second receiving unit 1552) of the image display device 10b receives (downloads), by accessing the storage server 30 based on the received storage destination information (symbol P28), the screen-sharing information provided from the storage server 30 (symbol P29). Then, the display controller 156 of the image display device 10b reproduces the same screen as that of the image display device 10a, by displaying on the display 110 the handwritten image based on the screen-sharing information provided from the management server 20 (symbol P30).

As in the foregoing, in the present embodiment, the image display device 10a provides the screen-sharing information to the image display device 10b via the management server 20 and the storage server 30. Meanwhile, the image display device 10b displays, on the display 110 of the image display device 10b, the handwritten image displayed on the display 110 of the image display device 10a on the basis of the screen-sharing information provided via the management server 20. In addition, the image display device 10b acquires, based on the storage destination information provided from the management server 20, the screen-sharing information from the storage server 30 and displays, on the display 110 of the image display device 10b, the handwritten image based on the relevant screen-sharing information.

As a result, in the present embodiment, the screen-sharing information for which the data amount is below the threshold value and the screen-sharing information for which the data size is greater than or equal to the threshold value can be transferred through different paths, and thus the efficiency concerning the screen sharing can be improved. In the present embodiment, the screen-sharing information for which the data amount is greater than or equal to the threshold value is not transmitted directly to the image display device 10b but transmitted in a form of storage destination information for which the data amount is small, and thus a delay in a handwritten image (screen-sharing information) input subsequent to the relevant screen-sharing information can be prevented.

In addition, because the image display device 10b displays the notification information when receiving the storage destination information, the user can be notified of the presence of screen-sharing information (handwritten image) not yet displayed. As a result, the image display device 10b can know the presence of a handwritten image not yet displayed before the relevant handwritten image is displayed, and thus the improvement in the convenience concerning screen sharing can be achieved. In addition, because the image display device 10b can also receive the screen-sharing information from the storage destination indicated in the storage destination information in response to the user operation, receiving (display) of the screen-sharing information for which the data amount is greater than or equal to the threshold value can be performed at any desired timing.

Figure 9:
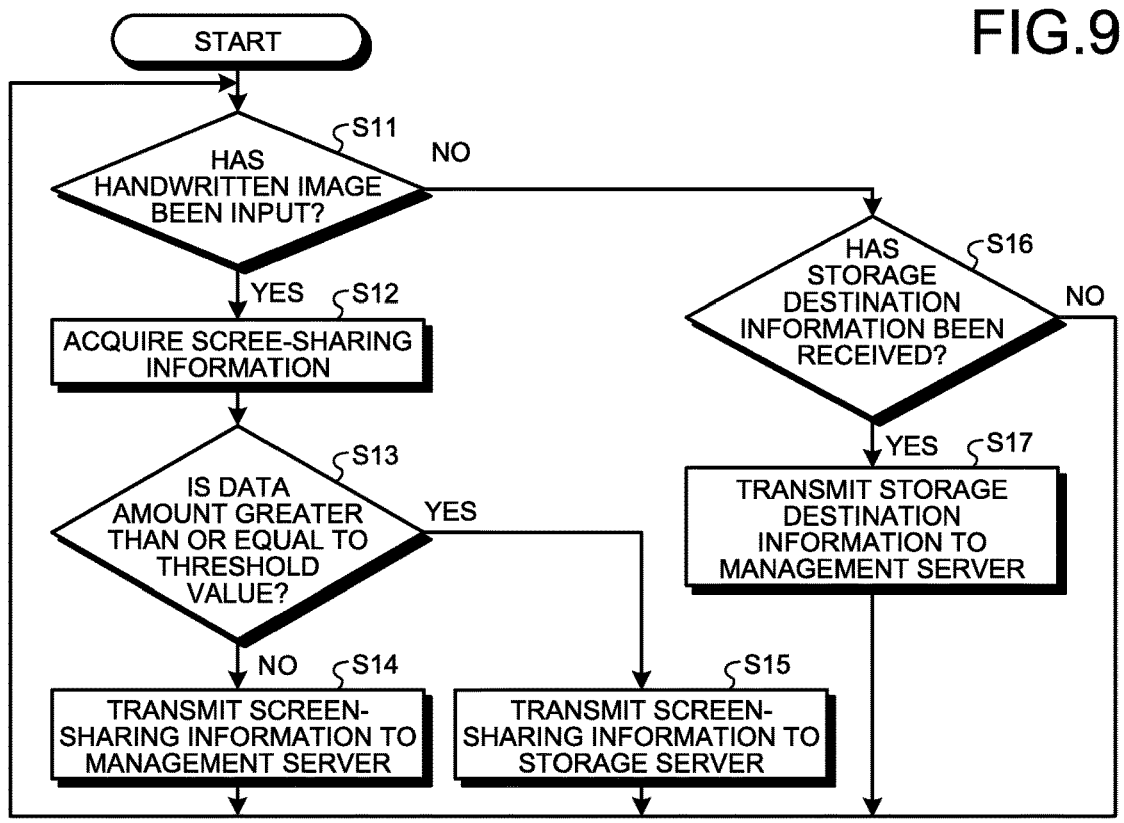
FIG. 9 is a flowchart illustrating one example of processing performed by the image display device of a screen-sharing source in the embodiment.

Next, with reference to FIG. 9 and FIG. 10, the operation of the above-described image display device 10 will be described. FIG. 9 is a flowchart illustrating one example of processing performed by the image display device 10a of the screen-sharing source.

First, in the image display device 10a, the acquisition unit 151 determines whether an input of a handwritten image has been made via the electronic pen 113a and the like (Step S11). When the handwritten input has been made (Yes at Step S11), the acquisition unit 151 acquires the input handwritten image as the screen-sharing information (Step S12).

Subsequently, the determining unit 152 determines whether the data amount of the screen-sharing information acquired by the acquisition unit 151 is greater than or equal to the threshold value (Step S13). When the data amount of the screen-sharing information is below the threshold value (No at Step S13), the transmission control unit 153 (the first transmission unit 1531) transmits the screen-sharing information to the management server 20 (Step S14) and the processing returns to Step S11.

When the data amount of the screen-sharing information is greater than or equal to the threshold value (Yes at Step S13), the transmission control unit 153 (the second transmission unit 1532) transmits the screen-sharing information to the storage server 30 (Step S15) and the processing returns to Step S11.

When an input of a handwritten image is not made at Step S11 (No at Step S11), the transmission control unit 153 (the second transmission unit 1532) determines whether the storage destination information has been received from the storage server 30 (Step S16). When the storage destination information is not notified from the storage server 30 (No at Step S16), the processing returns to Step S11.

Furthermore, at Step S16, when the transmission control unit 153 (the second transmission unit 1532) receives the storage destination information from the storage server 30 (Yes at Step S16), the transmission control unit 153 transmits the received storage destination information to the management server 20 (Step S17) and the processing returns to Step S11.

Figure 10:
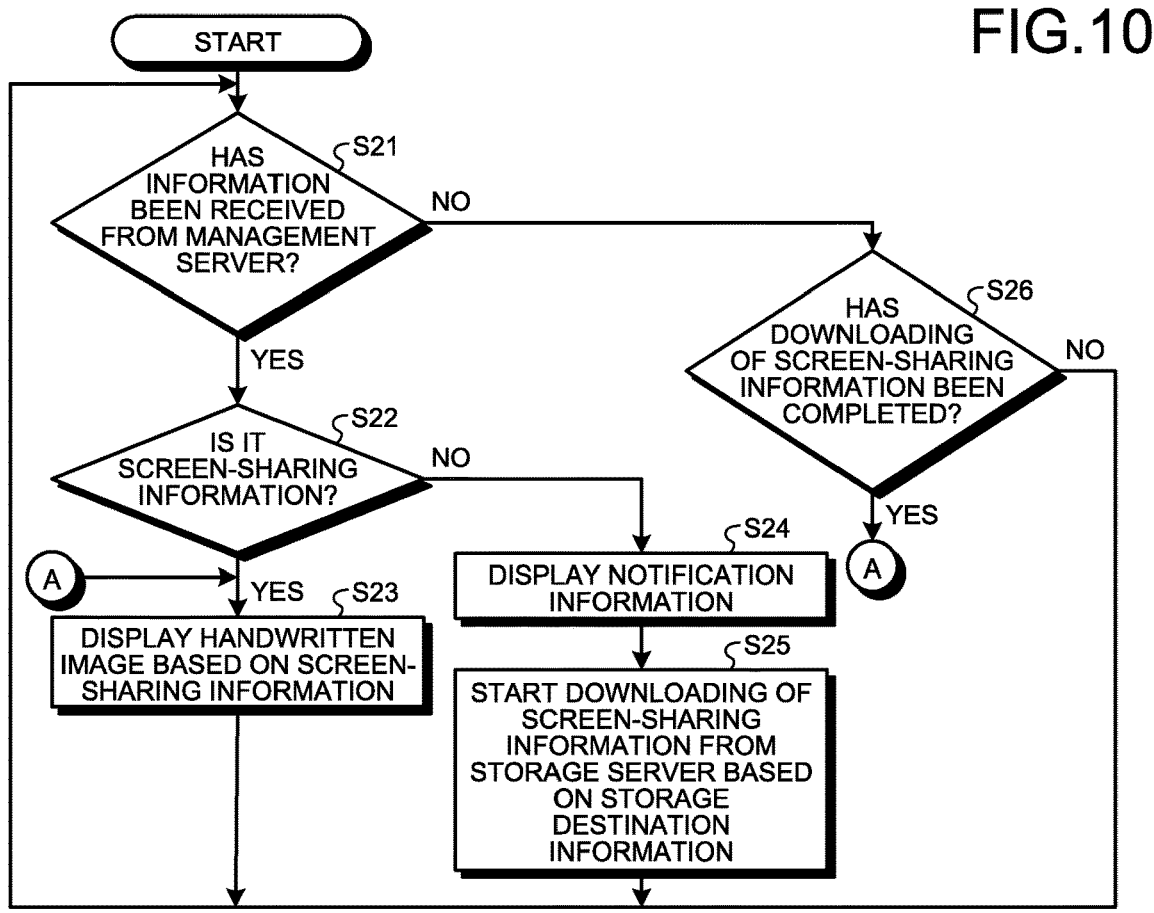
FIG. 10 is a flowchart illustrating one example of processing performed by the image display device of a screen-sharing destination in the embodiment.

Meanwhile, FIG. 10 is a flowchart illustrating one example of processing performed by the image display device 10b of the screen-sharing destination.

First, in the image display device 10b, the receiving control unit 155 (the first receiving unit 1551) determines whether information has been received from the management server 20 (Step S21). The receiving control unit 155 (the first receiving unit 1551) determines, upon receiving the information from the management server 20 (Yes at Step S21), whether the received information is the screen-sharing information or the storage destination information (Step S22).

When the received information is the screen-sharing information (Yes at Step S22), the display controller 156 displays on the display screen of the display 110 the handwritten image based on the relevant screen-sharing information (Step S23) and the processing returns to Step S21.

When the received information is the storage destination information (No at Step S22), the display controller 156 displays on the display screen of the display 110 the notification information that gives notice of the presence of the screen-sharing information corresponding to the storage destination information (Step S24). Then, the receiving control unit 155 (the second receiving unit 1552), by accessing the storage server 30 based on the storage destination information, starts downloading the screen-sharing information (Step S25) and the processing returns to Step S21.

At Step S21, when the information has not been provided from the management server 20 (No at Step S21), the receiving control unit 155 (the second receiving unit 1552) determines whether downloading the screen-sharing information has been completed (Step S26). When downloading the screen-sharing information from the storage server 30 is not being performed or when the downloading has not been completed (No at Step S26), the processing returns to Step S21.

At Step S26, when downloading the screen-sharing information has been completed (Yes at Step S26), the display controller 156 displays on the display screen of the display 110 the handwritten image based on the relevant screen-sharing information (Step S23), and the processing returns to Step S21.

As in the foregoing, according to the present embodiment, the image display device 10a acquires the image displayed on the display screen of the image display device 10a as the screen-sharing information and, when the data amount of the screen-sharing information is below the threshold value, provides it to the image display device 10b via the management server 20. In addition, when the data amount of the screen-sharing information is greater than or equal to the threshold value, the storage destination information about the screen-sharing information stored in the storage server 30 is provided to the image display device 10b via the management server 20. Meanwhile, the image display device 10b displays, on the display 110 of the image display device 10b, the screen-sharing information received from the management server 20 or the screen-sharing information received from the storage server 30 based on the storage destination information.

As a result, in the present embodiment, even if a handwritten image of large data amount is input in the image display device 10a, a handwritten image that is input subsequent to the relevant handwritten image can be transferred to the image display device 10b without being delayed. Consequently, the user of the image display device 10b can easily understand the situation of a handwritten input in the image display device 10a, and thus the improvement in communication between the users can be achieved.

In addition, the image display device 10b displays the notification information when receiving the storage destination information. As a result, even when a handwritten image that is input later is displayed before a handwritten image of large data amount that has been input earlier, the user of the image display device 10b can recognize a state in which the handwritten image of large data amount is not yet displayed, and thus the improvement in the convenience concerning the screen sharing can be achieved.

In the above-described embodiment, the image display device 10b of the screen-sharing destination, when receiving the storage destination information, gives notice that the storage destination information has been received or that there is the screen-sharing information (handwritten image) not yet displayed. However, the content of the notification is not limited thereto. For example, the position in the screen (hereinafter referred to as a drawing position) at which the screen-sharing information corresponding to the storage destination information is displayed as the handwritten image may be notified. The following describes, as a modification of the above-described embodiment, the configuration that can give notice of the drawing position.

Figure 11:
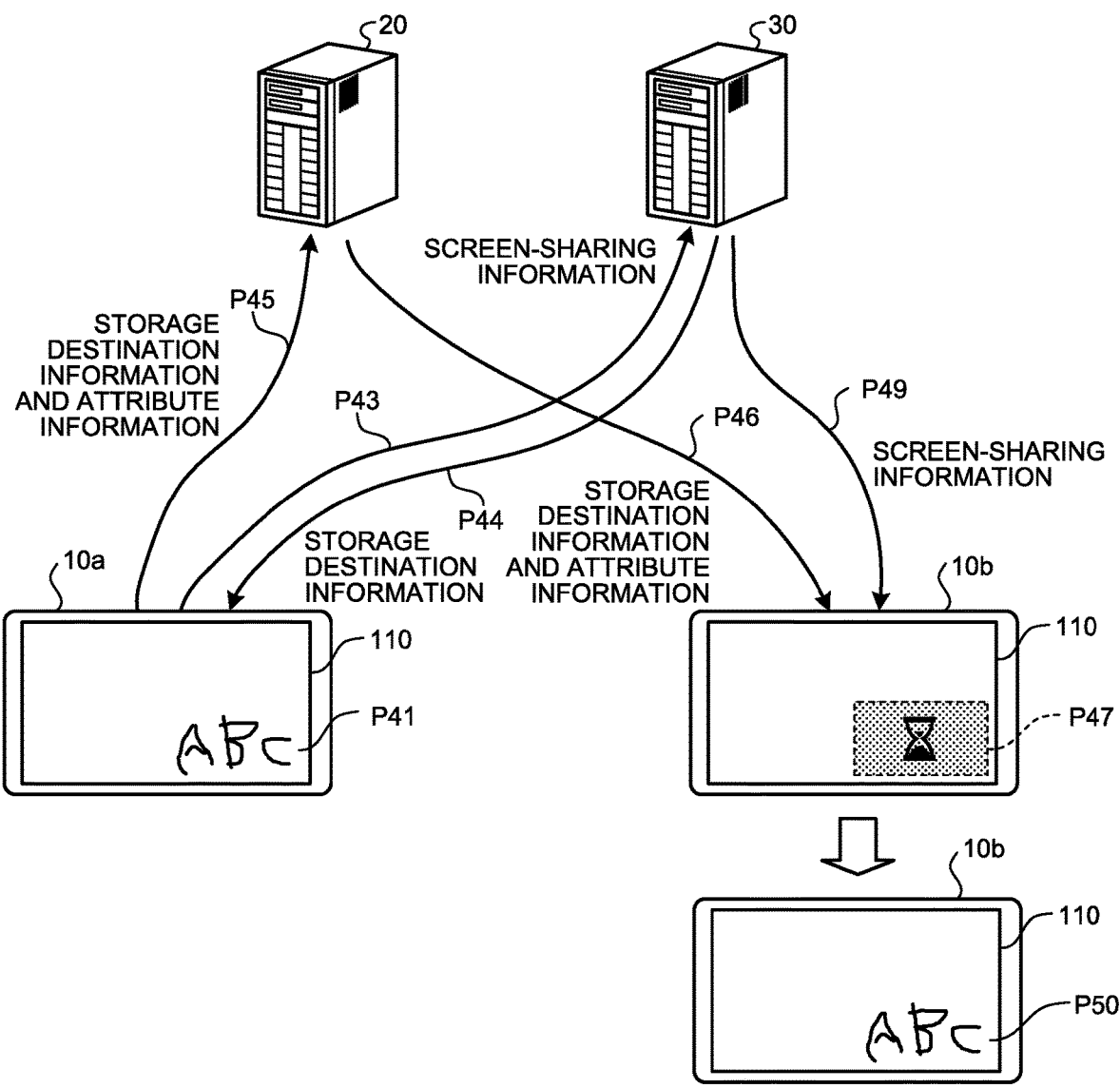
FIG. 11 is a diagram schematically illustrating the flow of information when providing the screen-sharing information via the storage server according to a modification.
Figure 12:
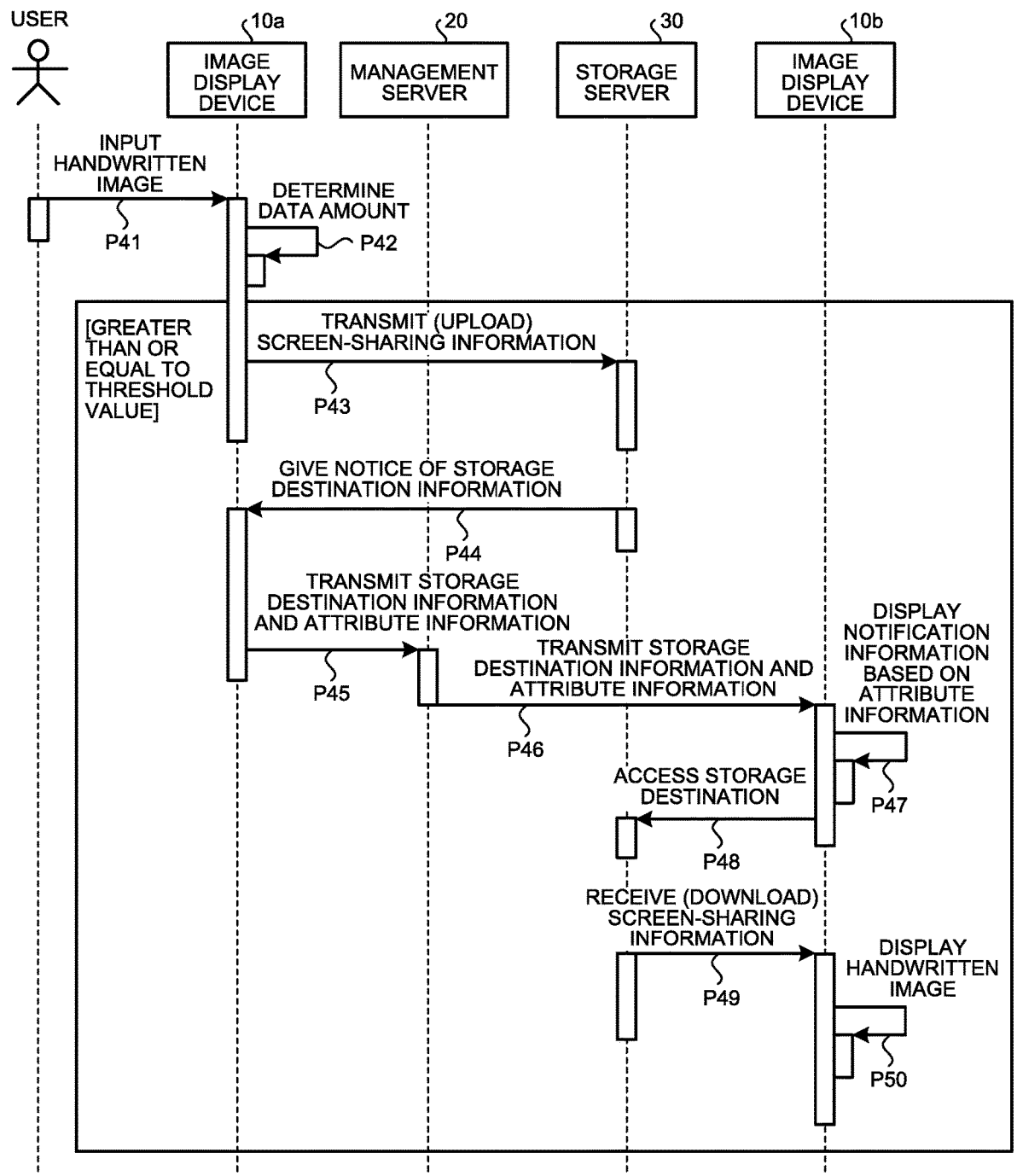
FIG. 12 is a sequence diagram illustrating an operation example when providing the screen-sharing information via the storage server in the modification.

Modification FIG. 11 and FIG. 12 are diagrams for explaining the operation of the screen sharing system 1 according to the present modification. FIG. 11 is a diagram schematically illustrating the flow of information when providing the screen-sharing information via the storage server 30. FIG. 12 is a sequence diagram illustrating an operation example when providing the screen-sharing information via the management server 20. The operations of the symbol P41 to the symbol P44 are the same as the operations of the symbol P21 to the symbol P24, respectively, of the above-described FIG. 7 and FIG. 8, and thus the descriptions thereof are omitted.

The transmission control unit 153 (the second transmission unit 1532) of the image display device 10a in the present modification, upon receiving a notice of the storage destination information from the storage server 30, transmits to the management server 20 the relevant storage destination information together with attribute information on the handwritten image extracted from the corresponding screen-sharing information and the like (symbol P45).

In this case, the attribute information includes information concerning the handwritten image. Specifically, the attribute information includes information that specifies a display area (bounding box information and the like) in which the handwritten image is displayed (drawn) on the display screen of the display 110 of the image display device 10a. The content of the attribute information is not limited to this example and may include other information. For example, the attribute information may include information indicating the data size and the like of the handwritten image (screen-sharing information).

In the management server 20, upon receiving the storage destination information and the attribute information from the image display device 10a, the first management unit 251 stores the received storage destination information and the attribute information in the first storage medium M1. Then, the first providing unit 252 provides the storage destination information and the attribute information stored in the first storage medium M1 to the image display device 10b.

Meanwhile, in the image display device 10b of the screen-sharing destination, the receiving control unit 155 (the second receiving unit 1552) receives the storage destination information and the attribute information provided from the management server 20 (symbol P46). The display controller 156 displays on the display screen of the display 110, based on the received attribute information, the notification information that gives notice of the display area at which the screen-sharing information (handwritten image) corresponding to the storage destination information is displayed (symbol P47). Subsequently, the receiving control unit 155 (the second receiving unit 1552) of the image display device 10b receives, by accessing the storage server 30 based on storage destination information (symbol P48), the screen-sharing information provided from the storage server 30 (symbol P49).

FIG. 11 illustrates an example in which the display area at which the screen-sharing information (handwritten image) is displayed on the display screen of the display 110 is displayed by using hatching so as to be recognizable. FIG. 11 further indicates that, with an hourglass icon, the screen-sharing information is being downloaded.

Then, the display controller 156 of the image display device 10b reproduces the same screen as that of the image display device 10a, by displaying on the display screen of the display 110 the handwritten image based on the screen-sharing information provided from the storage server 30 (symbol P50). In this case, the position at which the handwritten image is displayed corresponds to the display area.

As in the foregoing, according to the present modification, the image display device 10b, upon receiving the storage destination information from the management server 20, displays as the notification information the display area of the handwritten image displayed by the corresponding screen-sharing information based on the attribute information received at the same time. As a result, the user of the image display device 10b can understand beforehand, by the screen-sharing information for which the display is withheld and the data amount is greater than or equal to the threshold value, the position at which the handwritten image is displayed, and thus the improvement in the convenience concerning screen sharing can be achieved.

The above-described various functions of the embodiment can be implemented by one or a plurality of processing circuits. In the present specification, "processing circuit" includes devices such as a processor that is programmed so as to execute various functions by software like a processor implemented by an electronic circuit, an ASIC (application-specific integrated circuit) that is designed to execute the above-described various functions, a DSP (digital signal processor), an FPGA (field-programmable gate array), and a conventional circuit module.

When at least a part of the various functions of the above-described embodiment is implemented by the execution of a computer program, the computer program is provided being incorporated in an appropriate storage device in advance. The computer program may be recorded and provided in a file of an installable or executable format on a computer-readable recording medium such as a CD-ROM, a flexible disk (FD), a CD-R, and a DVD. Furthermore, the computer program may be configured to be stored in a computer connected to a network such as the Internet and be provided by downloading via the network. The computer program may be configured to be provided or distributed via a network such as the Internet. The computer program may be in a modular configuration that includes at least a part of the above-described various functions.

In the above description, the image display device 10 has been described as an information processing apparatus. However, as long as a device includes the display function and the communication function, the image display device 10 is not limited thereto. The information processing apparatus may be an output device such as a PJ (projector), an IWB (interactive white-board: white-board having an electronic blackboard function capable of intercommunication), and a digital signage, a HUD (head-up display), an industrial machinery, imaging equipment, a sound collection device, medical equipment, a network-connected home appliance, an automobile (connected car), a laptop PC (personal computer), a mobile phone, a smartphone, a tablet device, a game machine, a PDA (personal digital assistant), a digital camera, a wearable PC, a desktop PC, or the like, for example.

Furthermore, the set of devices in the foregoing embodiments merely illustrates one of a plurality of computer environments for implementing the embodiment disclosed in the specification. For example, in one embodiment, the management server 20 includes a plurality of computing devices such as a server cluster. The computing devices are configured to perform communication with one another via a communication link of any desired type including a network, a shared memory, and the like, and perform the processing disclosed in the present specification. Similarly, the storage server 30 can include a plurality of computing devices that are configured to perform communication with one another. The respective constituents of the management server 20 and the storage server 30 may be put together into a single server device or may be distributed over a plurality of devices.

According to an embodiment, screen sharing among information processing apparatuses can be efficiently performed.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:

1. A screen sharing system, comprising:
a first information processing apparatus; and
a second information processing apparatus connected via a network,
wherein the first information processing apparatus includes:
acquisition circuitry configured to acquire, as screen-sharing information, an image displayed on a display screen of the first information processing apparatus;
a first transmitter to transmit the screen-sharing information to a first server connected to the network, when a data amount of the screen-sharing information is below a threshold value; and
a second transmitter to transmit the screen-sharing information to a second server connected to the network and to transmit, to the first server, storage destination information indicating a storage destination of the screen-sharing information in the second server, when the data amount of the screen-sharing information is greater than or equal to the threshold value, and
wherein the second information processing apparatus includes:
a first receiver to receive, from the first server, the screen-sharing information or the storage destination information that the first information processing apparatus has transmitted;
a second receiver to receive, based on the storage destination information received by the first receiver, the screen-sharing information from the second server, and display control circuitry configured to display, on a display screen of the second information processing apparatus, an image based on the screen-sharing information received by the first receiver or the second receiver, wherein the first server is separate from the first information processing apparatus and the second information processing apparatus, and wherein the second server is separate from the first information processing apparatus and the second information processing apparatus.

2. The screen sharing system according to claim 1, wherein the display control circuitry is configured to display notification information giving notice of presence of an image not yet displayed, in response to the first receiver receiving the storage destination information.

3. The screen sharing system according to claim 2, wherein the second transmitter is configured to provide, to the second information processing apparatus via the first server, attribute information concerning an image of the screen-sharing information stored in a storage destination indicated by the storage destination information, together with the storage destination information, and the display control circuitry is configured to display the notification information based on the attribute information received by the second receiver.

4. The screen sharing system according to claim 3, wherein the second transmitter is configured to provide, as the attribute information, information specifying a display area in which the image is displayed on the display screen of the first information processing apparatus, to the second information processing apparatus via the first server, and the display control circuitry is configured to, based on the attribute information, give notice of the display area of the image on the display screen of the second information processing apparatus.

5. The screen sharing system according to claim 1, wherein the second receiver is configured to start receiving the screen-sharing information from the second server, under a condition that an instruction to access a storage destination indicated by the storage destination information has been received.

6. An information processing apparatus of a screen-sharing source configured to perform screen sharing with a further information processing apparatus connected via a network, the information processing apparatus comprising:

acquisition circuitry configured to acquire, as screen-sharing information, an image displayed on a display screen of the information processing apparatus;

a first transmitter configured to transmit the screen-sharing information to a first server connected to the network and to provide the screen-sharing information to the further information processing apparatus via the first server, when a data amount of the screen-sharing information is below a threshold value; and a second transmitter configured to transmit the screen-sharing information to a second server connected to the network and to transmit, to the further information processing apparatus via the first server, storage destination information indicating a storage destination of the screen-sharing information in the second server, when the data amount of the screen-sharing information is greater than or equal to the threshold value, wherein the first server is separate from the information processing apparatus and the further information processing apparatus, and wherein the second server is separate from the information processing apparatus and the further information processing apparatus.

7. An information processing apparatus of a screen-sharing destination configured to perform screen sharing with a further information processing apparatus connected via a network, the information processing apparatus comprising:

a first receiver configured to receive, via a first server connected to the network, screen-sharing information representing an image displayed on a display screen of the further information processing apparatus or storage destination information indicating a storage destination of the screen-sharing information;

a second receiver configured to receive, based on the storage destination information received by the first receiver, the screen-sharing information from a second server connected to the network; and display control circuitry configured to display, on a display screen of the information processing apparatus, an image based on the screen-sharing information received by the first receiver or the second receiver, wherein the first server is separate from the information processing apparatus and the further information processing apparatus, and wherein the second server is separate from the information processing apparatus and the further information processing apparatus.

8. The information processing apparatus according to claim 6, wherein:

the second transmitter is configured to provide, to the further information processing apparatus via the first server, attribute information concerning an image of the screen-sharing information stored in the storage destination indicated by the storage destination information, together with the storage destination information, and the second transmitter is configured to provide, as the attribute information, information specifying a display area in which the image is displayed on the display screen of the information processing apparatus, to the further information processing apparatus via the first server, the information processing apparatus further comprising display control circuitry configured to, based on the attribute information, give notice of the display area of the image on a display screen of the further information processing apparatus.

9. The information processing apparatus according to claim 7, wherein:

the display control circuitry is further configured to display notification information giving notice of presence of an image not yet displayed, in response to the first receiver receiving the storage destination information, the second receiver receives attribute information concerning an image of the screen-sharing information stored in a storage destination indicated by the storage destination information, together with the storage destination information, the display control circuitry is configured to display the notification information based on the attribute information received by the second receiver, the second receiver is configured to receive, as the attribute information, information specifying a display area in which the image is displayed on a display screen of the further information processing apparatus, to the information processing apparatus via the first server, and the display control circuitry is configured to, based on the attribute information, give notice of the display area of the image on the display screen of the information processing apparatus.

\* \* \* \* \*